United States Patent
Kawasaki

[11] Patent Number: 5,823,231
[45] Date of Patent: Oct. 20, 1998

[54] MULTI-LAYERED HOSE

[75] Inventor: Minoru Kawasaki, Komaki, Japan

[73] Assignee: Tokai Rubber Industries, Ltd., Komaki, Japan

[21] Appl. No.: 831,083

[22] Filed: Apr. 1, 1997

Related U.S. Application Data

[63] Continuation of Ser. No. 546,950, Oct. 23, 1995, Pat. No. 5,664,608, which is a continuation of Ser. No. 129,402, Sep. 30, 1993, abandoned.

[30] Foreign Application Priority Data

Sep. 30, 1992 [JP] Japan .................................. 4-286689

[51] Int. Cl.$^6$ .................................................. F16L 11/12
[52] U.S. Cl. ........................ 138/109; 138/139; 138/141; 138/177
[58] Field of Search .................. 138/103, 109, 138/131, 137, 139, 140, 141, 177, 178

[56] References Cited

U.S. PATENT DOCUMENTS

| | | | |
|---|---|---|---|
| 1,924,020 | 8/1933 | Bihet | 277/207 A |
| 2,690,901 | 10/1954 | McCormack | 138/137 |
| 3,500,868 | 3/1970 | Hardt et al. | 138/139 |
| 4,014,556 | 3/1977 | Anderson | 277/207 A |
| 4,147,185 | 4/1979 | Hines | 138/139 |
| 4,157,194 | 6/1979 | Takahashi | 138/113 |
| 4,313,629 | 2/1982 | Winterhalter | 285/242 |
| 4,603,888 | 8/1986 | Goodall et al. | 285/55 |
| 4,775,171 | 10/1988 | Marshall . | |
| 4,966,202 | 10/1990 | Bryan et al. | 138/139 |
| 4,984,831 | 1/1991 | Bengtsson | 277/207 A |
| 5,255,974 | 10/1993 | Signer | 138/109 |
| 5,443,099 | 8/1995 | Chaussepied et al. | 138/109 |
| 5,472,746 | 12/1995 | Miyajima et al. | 138/109 |
| 5,518,035 | 5/1996 | Hoshishima et al. | 138/109 |

FOREIGN PATENT DOCUMENTS

| | | |
|---|---|---|
| 63-270 125 | 11/1988 | Japan . |
| 1 247 158 | 10/1989 | Japan . |

*Primary Examiner*—Denise L. Ferensic
*Assistant Examiner*—James F. Hook
*Attorney, Agent, or Firm*—Jacobson, Price, Holman & Stern, PLLC

[57] ABSTRACT

A multi-layered hose according to the present invention comprises a rubber outer layer and a resin or metal inner layer which is integrally formed at the inner periphery surface of the rubber outer layer. The thickness of the resin inner layer formed at the inner periphery surface of the edge portion is thinner than that of the resin inner layer formed at the inner periphery surface of a main portion of the hose. Therefore, when a mating pipe is inserted into the hose edge portion, the mating pipe is satisfactorily adhered to the inner surface of the hose edge portion, thereby obtaining excellent sealing.

18 Claims, 8 Drawing Sheets

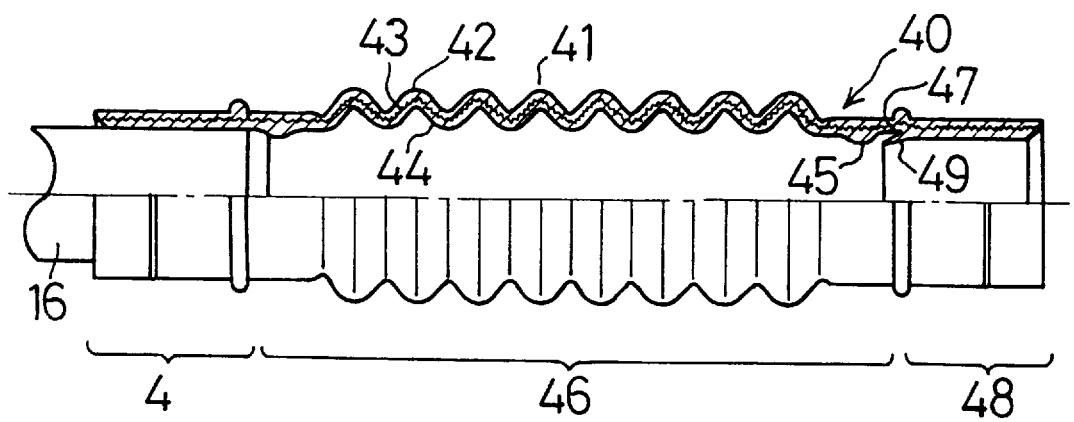
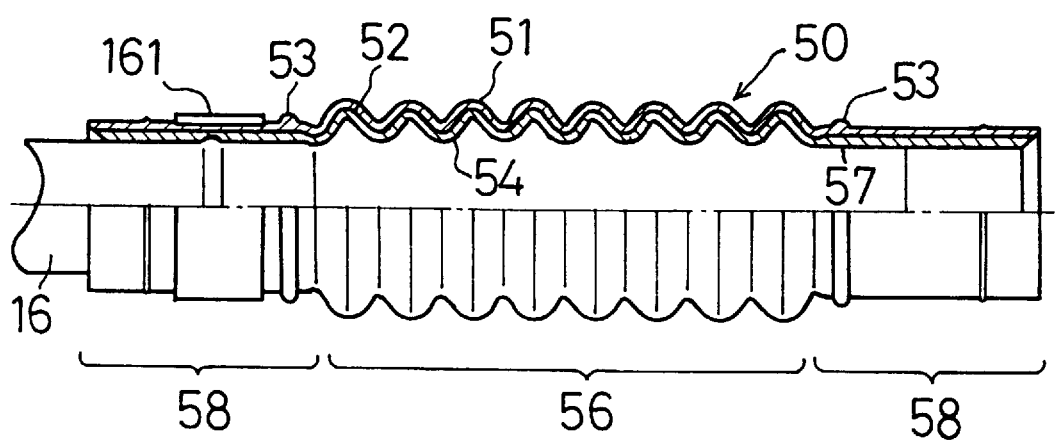

MULTI-LAYERED HOSE

This is a continuation of application Ser. No. 08/546,950, filed Oct. 23, 1995, now U.S. Pat. No. 5,664,608, which in turn is a continuation of application Ser. No. 08/129,402, filed Sep. 30, 1993, now abandoned.

BACKGROUND OF THE INVENTION

1. Field of the Invention

The present invention relates to a multi-layered hose which is suitable for use as a filler hose for automobiles.

2. Description of the Related Art

Conventionally, a rubber material such as NBR·PVC rubber which shows oil resistance and oil penetration resistance is used as a filler hose (a fuel hose) for automobiles.

However, the above filler hose comprising only rubber can't cope with recent severe regulations of oil penetration resistance.

To solve the above problem, as shown in FIG. 25, a thin and fluorine-contained rubber inner layer 102 is formed at the inner periphery surface of a rubber outer layer 100.

The above hose having the fluorine-contained rubber inner layer 102 shows excellent efficiency, but the cost is high. So, it is not suitable for practical use.

Concerning the conventional hose for transmitting refrigerant, as shown in FIGS. 26 and 27, it is usual that a thin resin inner layer 104 is laminated on the inner periphery surface of a rubber outer layer 100.

When the above laminated structure is applied to a filler hose, the resin inner layer 104 having excellent oil resistance and excellent oil penetration resistance is laminated on the inner periphery surface of the rubber outer layer 100. Therefore, it is possible to easily obtain excellent oil resistance and excellent oil penetration resistance while maintaining flexibility which is required for the hose. Furthermore, it is possible to obtain an inexpensive hose.

In this case, a hard resin material is usually used as the resin inner layer 104, and the resin inner layer 104 is formed to have a certain thickness which is required for obtaining oil resistance and oil penetration resistance. This is because the hard resin material shows more excellent oil resistance than that of the soft resin material.

Concerning the conventional hose having the above laminated structure, as shown in FIG. 29, a resin tube (a resin inner layer 104) is extrusion-molded. Then, a rubber tube (a rubber outer layer 100) is extrusion-molded and laminated on the outside of the resin inner layer 104. Furthermore, the obtained rubber tube is valcanized or semi-valcanized, and bent to be in the certain direction. After that, the obtained rubber tube is valcanized to be produce the hose as shown in FIG. 28. The resin inner layer 104 in the inside of the obtained hose has the same thickness at either the hose main portion or the hose edge portion.

Concerning a filler hose, a mating pipe made of metal is inserted into the inside of the hose edge portion. Since a hard resin inner layer is formed in the inside of the hose edge portion to have a certain thickness, the mating pipe is not fully adhered to the inside of the hose edge portion, thereby not obtaining enough sealing.

SUMMARY OF THE INVENTION

It is an object of the present invention to solve the above problems.

A multi-layered hose according to the present invention comprises a rubber outer layer and a resin or metal inner layer which is integrally formed at the inner periphery surface of the rubber outer layer, and a mating pipe is inserted into the inside of the hose edge portion. The resin inner layer is formed at the inner periphery surface of the hose main portion except that the hose edge portion into which the mating pipe is inserted.

In another multi-layered hose according to the present invention, an inner layer is formed at the inner periphery surface of a main portion and an edge portion of an outer layer, and the thickness of the inner layer which is formed at the inner periphery surface of the hose edge portion is thinner than that of the inner layer which is formed at the inner periphery surface of the hose main portion.

In the other multi-layered hose according to the present invention, an inner layer is formed at the inner periphery surface of a main portion of an outer layer and at a part of the inner periphery surface of an edge portion near the main portion of the outer layer.

In view of an axial direction, a multi-layered hose according to the present invention comprises two edge portions for forming both side portions, and a central portion for connecting side portions. A nipple made of a metal or a hard resin is inserted into the edge portion. The central portion is a main portion, and it is formed in straight-shaped, curve-shaped or bellows-shaped.

When the multi-layered hose according to the present invention is used as a filler hose for automobiles and when the inner layer is made of resin, it is desirable that the resin material for forming the inner layer has an excellent oil penetration resistance in which the penetration constant is not more than 5 mg·mm/cm$^2$·day. Furthermore, it is preferable that the penetration constant is not more than 1 mg·mm/cm$^2$·day, and more preferably, not more than 0.3 mg·mm/cm$^2$·day.

The oil penetration constant is measured as follows. A cup is filled with gasoline, and a resin film having the thickness of 1 mm is attached to the upper surface of the cup in order not to leak gasoline. While maintaining the condition that the film is contacted to gasoline, the cup is let alone at the temperature of 40° C., and a decreased weight is measured at every 24 hours. After being stabled, the decreased weight of the resin film per 1 mm and 1 cm$^2$ (mg·mm/cm$^2$·day) is calculated, and it is determined as the oil penetration constant.

Concerning the multi-layered hose according to the present invention, when the inner layer is made of resin, the thickness of the inner layer is in the range of 0.01 to 1 mm, preferably, in the range of 0.05 to 0.7 mm, more preferably, in the range of 0.1 to 0.4 mm. When a thin resin inner layer is formed at the inner periphery surface of the hose edge portion, the thickness of the thin resin inner layer is not more than 0.1 mm, preferably, not more than 0.05 mm. When the inner layer is made of metal, the thickness of the thin resin inner layer is not more than 0.2 mm, preferably, not more than 0.15 mm.

Concerning the inner layer which is formed at the inner periphery surface of the hose edge portion, it is preferable that the thickness is decreased as the inner layer is far from boundary portion of the hose main portion and the hose edge portion. The inner layer can be formed at a part of the inner periphery surface of the edge portion near the main portion.

When the thickness of the resin inner layer which is formed at the inner periphery surface of the hose edge portion is set as above, a stress concentration on the edge surface of the resin inner layer is effectively prevented.

The multi-layered hose according to the present invention can be used as other hose except as a filler hose.

The outer layer can be a single rubber layer or a multiple of rubber layers. In the rubber layer, a reinforced thread or a reinforced cloth can be disposed.

Concerning one multi-layered hose according to the present invention, no resin inner layer or no metal inner layer is formed at the inner periphery surface of the hose edge portion into which the mating member is inserted. Concerning another multi-layered hose according to the present invention, a resin or metal inner layer is formed at the inner periphery surface of a main portion of an outer layer and at a part of the inner periphery surface of an edge portion near the main portion of the outer layer. Concerning the other multi-layered hose according to the present invention, an inner layer is formed at the inner periphery surface of a main portion and an edge portion of an outer layer, and the thickness of the inner layer which is formed at the inner periphery surface of the hose edge portion is thinner than that of the inner layer which is formed at the inner periphery surface of the hose main portion.

In the multi-layered hose, no resin inner layer or no metal inner layer or a thin inner layer is formed at the inner periphery surface of the hose edge portion into which the mating member is inserted. A resin inner layer is formed at the inner periphery surface of the hose main portion. Since no resin inner layer or a thin inner layer is formed at the inner periphery surface of the hose edge portion, a mating pipe is satisfactorily adhered to the inside of the hose edge portion when the mating pipe is inserted into the hose edge portion, thereby obtaining enough sealing at the connecting edge portion.

Furthermore, the inner side of the hose edge portion is covered since the mating member is inserted and engaged with the hose. Therefore, the hose is not deteriorated due to an inner fluid such as gasoline, and the penetration of gasoline doesn't occur.

Therefore, the multi-layered hose according to the present invention shows excellent oil resistance and excellent oil penetration resistance. Furthermore, the multi-layered hose can be produced at low price, and it shows satisfactory sealing at the hose edge portion.

Concerning the multi-layered hose in which the thin inner layer is formed at the inner periphery surface of the hose edge portion or the multi-layered hose in which the inner layer is formed at a part of the inner periphery surface of the hose edge portion near the main portion, sealing is deteriorated since the inner layer is made of resin. However, the inner layer is formed at the main portion and the edge portion of the hose so that the following problems don't occur. When no inner layer is formed at the inner periphery surface of the hose edge portion, a stress concentration is generated at or near a boundary between rubber and resin of the inner periphery surface due to the physical difference between rubber and resin. And, the function of an inner fluid is much different. Therefore, the edge surface portion of the resin inner layer is likely to be come off from the rubber outer layer.

In the multi-layered hose according to the present invention, the thickness of the resin inner layer becomes thinner, and the resin inner layer is formed only at a part of the edge portion. Moreover, an excellent trailability for the rubber outer layer is obtained. Furthermore, a stress concentration on the edge surface portion of the resin inner layer and peeling of the edge surface of the resin inner layer due to the function of an inner fluid are effectively prevented since the hose edge portion is supported between the rubber outer layer and the mating member.

Moreover, the thickness of the resin inner layer which is formed at the hose edge portion is thin, and the resin inner layer is formed only at a part of the edge portion, so flexibility at the hose edge portion is not deteriorated, and excellent sealing can be obtained.

BRIEF DESCRIPTION OF THE DRAWINGS

FIG. 23 is a whole view of the multi-layered hose in the Twelfth Preferred Embodiment in which the upper-side is the cross-sectional view.

FIG. 24 is a whole view of the multi-layered hose in the Thirteenth Preferred Embodiment in which the upper-side is the cross-sectional view.

DETAILED DESCRIPTION OF THE PREFERRED EMBODIMENTS

Having generally described the present invention, a further understanding can be obtained by reference to the specific preferred embodiments which are provided herein for purposes of illustration only and are not intended to limit the scope of the appended claims.

The Preferred Embodiments according to the present invention will be hereinafter described with reference to FIGS. 1 through 29.

First Preferred Embodiment

Figure 1:
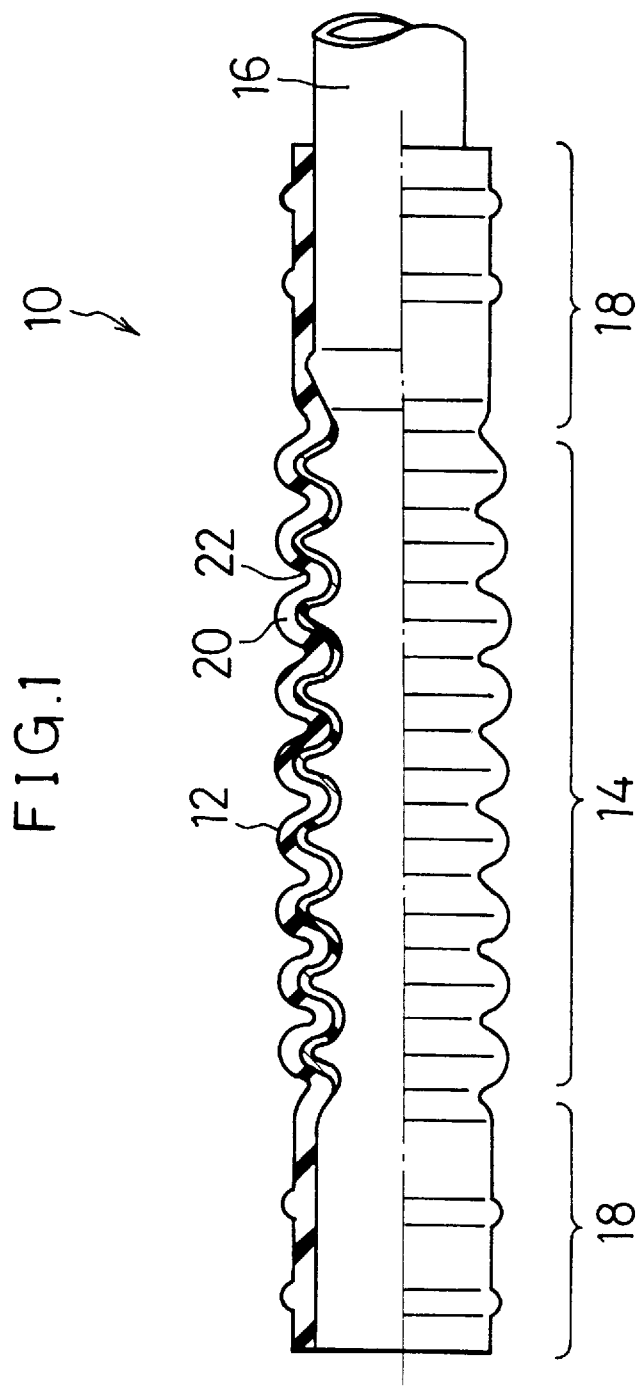
FIG. 1 shows a cross-sectional view of a multi-layered hose in the First Preferred Embodiment.

FIG. 1 shows a multi-layered hose 10 of the First Preferred Embodiment. In FIG. 1, the left side is a cross-sectional view, and a nipple 16 of a mating member is inserted into an upper edge portion.

The multi-layered hose 10 is a filler hose for automobiles in which gasoline is transmitted. The multi-layered hose 10 comprises a main portion 14 having an inner diameter of 34 mm and a bellows portion 12, and an edge portion 18 into which a nipple 16 made of a metal pipe of a mating member is inserted.

Concerning composition materials, the multi-layered hose 10 comprises a rubber outer layer 20 and a resin inner layer 22 which is integrally connected with an inner periphery surface of the main portion of the outer layer 20. Between the outer layer 20 and the inner layer 22, an adhesive layer exists (not shown).

The rubber materials of the outer layer 20 include NBR PVC, CR, CHC, CSH, EPDM and so on. The outer layer 20 can be a single rubber layer or a multiple of rubber layers. When the outer layer 20 is a multiple of rubber layers, the inside of the outer layer comprises rubber having excellent oil resistance, and the outside of the outer layer comprises rubber having excellent fire resistance and excellent wear resistance. In this case, the multi-layered hose shows not only excellent oil resistance but also excellent fire resistance and excellent wear resistance.

The resins of the inner layer 22 include polyamide, fluorine, polyester, polyvinyl chloride, polyacetal, PPS and so on. These resins show excellent oil resistance and excellent oil penetration resistance, and an oil penetration constant is not more than 1 mg·mm/cm$^2$·day. Furthermore, the inner layer 22 can be made of metal instead of resin.

In the multi-layered hose 10, the hose main portion 14 which is exposed to an inner fluid has a laminated structure comprising the rubber outer layer 20 and the resin inner layer 22. The hose main portion 14 also has a bellows portion. Therefore, the hose main portion 14 effectively controls oil penetration due to the inner layer 22 made of resin while maintaining excellent flexibility. On the other hand, the inner layer 22 is not formed at the hose edge portion 18 so that the outer layer 20 made of flexible rubber is closely engaged with the nipple 16 of the mating member, thereby obtaining excellent sealing.

The multi-layered 10 hose shows excellent flexibility, excellent oil resistance, excellent oil penetration resistance, and excellent sealing with the mating metal pipe 16. These characteristics are required for hoses.

In the multi-layered hose 10, the inner layer 22 is not formed at the inner surface of the edge portion 18, but the inner surface of the edge portion 18 is engaged with the mating metal pipe 16. As a result, the inner surface of the edge portion 18 is not directly contacted to gasoline so that gasoline is not penetrated to outside through the hose edge portion 18.

Concerning the main portion 14 of the multi-layered hose 10, the outer layer 20 is adhered to the inner layer 22. Therefore, it is prevented that the inner layer 22 is come off from the outer layer 20 because of negative pressure and vibration which are acted on the inside of the multi-layered hose 10, and deformation of the multi-layered hose 10.

There are two kinds of methods for connecting the rubber outer layer 20 and the resin inner layer 22. One method is that an adhesive is applied to the inner surface of the rubber outer layer 20 before the resin inner layer 22 is laminated on the rubber outer layer 20. The other method is that an adhesive is kneaded into rubber of the rubber outer layer 20 and/or resin of the resin inner layer 22.

In the multi-layered hose 10, a core bar (not shown) is used, and it has the same shape as that of the hose hole. On the outer surface of the core bar, a resin film for forming the inner layer 22 is formed. After that, an adhesive is coated on the surface of the resin film. Then, a predetermined unvalcanized rubber is coated on the core bar having the resin film. Finally, the obtained core bar is put into a metallic mold and heated to be valcanized-molding. In order to take out the obtained multi-layered hose from the core bar and the metallic mold, they are preferably a combination type comprising many parts. In stead of coating the adhesive on the resin film, it is effective that the resin film is activated. This activated method include a sodium-etching treatment, a surface oxidized treatment due to plasma flame, a physical treatment such as sputtering, and so on. When the resin surface is activated, rubber is valcanized and adhered to the resin surface to complete the strong connection between rubber and resin.

The other method for producing the multi-layered hose is as follows. At first, rubber for forming the outer layer 22 is injection-molded to obtain a rubber compact. Then, an edge portion of the inner periphery surface of the obtained rubber compact is masked, and resin powder is coated to the inner periphery surface of the main portion in the same method as static powder coating. After that, the obtained hose is heated and the resin powder is melted to be the inner layer. In this method, the rubber compact for forming the outer layer can be valcanized at the time of molding, or it can be molded without being valcanized. Concerning the latter case, the rubber compact is valcanized by heat which is generated at the time when the resin powder is melted.

Second Preferred Embodiment

Figure 2:
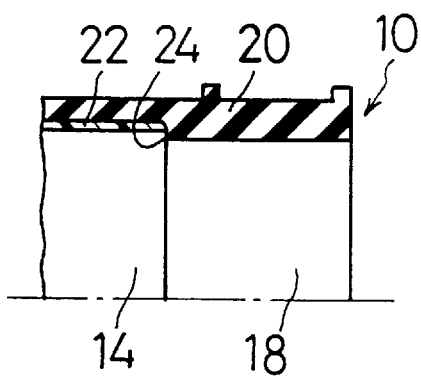
FIG. 2 shows a main cross-sectional view of a multi-layered hose in the Second Preferred Embodiment.

FIG. 2 shows a main cross-sectional area of a multi-layered hose 10 of the Second Preferred Embodiment. FIG.

3 shows a main cross-sectional area of the multi-layered hose 10 of the Second Preferred Embodiment when the nipple 16 is inserted into the edge portion of the multi-layered hose 10.

In the multi-layered hose 10, the inner diameter of the edge portion 18 is smaller than that of the main portion 14. Namely, the thickness of the multi-layered hose 10 is thick at the edge portion, and a low stepping portion 24 is disposed between the main portion 14 and the edge portion 18. The edge surface of the resin inner layer 22 is contacted to the stepping portion 24 on the inner periphery surface of the rubber outer layer 20.

Figure 3:
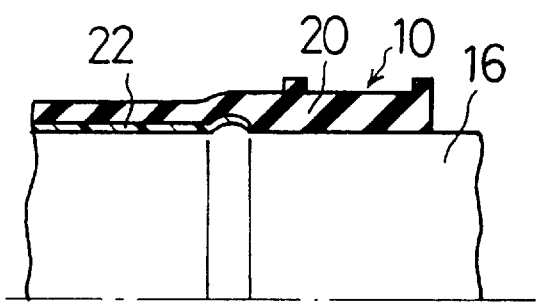
FIG. 3 is a main cross-sectional view for showing the condition that a nipple is inserted into the edge portion of the multi-layered hose in the Second Preferred Embodiment.

In the multi-layered hose 10, the edge surface of the inner layer 22 is covered with the stepping portion 24 on the inner periphery surface of the outer layer 20 so that the inner layer 22 is hardly come off from the edge surface. As shown in FIG. 3, the large diameter portion on the outer periphery of the tip portion of the nipple 16 is engaged with the edge of the main portion 14. At this time, the inner periphery diameter of the main portion 14 is larger than that of the edge portion 18. As a result, the edge of the inner layer 22 is not greatly enlarged by the tip portion of the nipple 16. Therefore, the extension of the inner layer 22 becomes less.

The multi-layered hose 10 of the Second Preferred Embodiment is produced by the same method as that of the First Preferred Embodiment.

Third Preferred Embodiment

Figure 4:
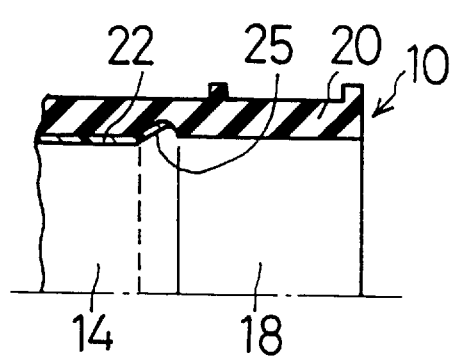
FIG. 4 is a main cross-sectional view of a multi-layered hose in the Third Preferred Embodiment.
Figure 5:
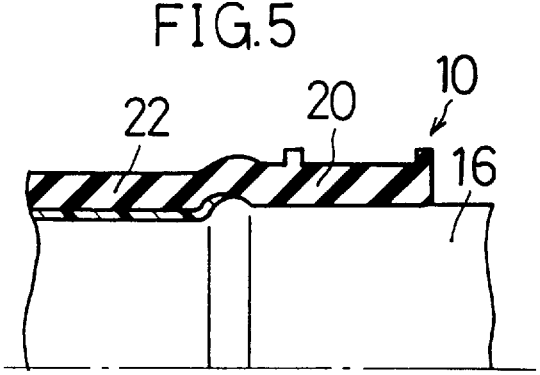
FIG. 5 is a main cross-sectional view for showing the condition that a nipple is inserted into the edge portion of the multi-layered hose in the Third Preferred Embodiment.

FIG. 4 shows a main cross-sectional area of a multi-layered hose 10 of the Third Preferred Embodiment. FIG. 5 shows a main cross-sectional area of the multi-layered hose 10 of the Third Preferred Embodiment when the nipple 16 is inserted into the edge portion of the multi-layered hose 10.

In the multi-layered hose 10, a ring-shaped groove 25 is disposed at a boundary portion between the edge portion 18 and the main portion 14 of the rubber outer layer 20. As shown in FIG. 4, the ring-shaped groove 25 has the sectional shape in which the inner periphery diameter increases from the main portion 14 toward the edge portion 18 and it becomes small at the edge portion 18. The edge of the resin inner layer 22 is disposed at the largest inner periphery diameter portion of the ring-shaped groove 25, and the edge surface of the inner layer 22 is contacted to the inner wall of the ring-shaped groove 25.

The multi-layered hose 10 of the Third Preferred Embodiment has the same functions and effects as those of the multi-layered hose 10 of the Second Preferred Embodiment. The inner layer 22 is hardly come off from its edge surface. And, the edge of the inner layer 22 is not greatly enlarged by the tip portion of the nipple 16. Therefore, the extension of the inner layer 22 becomes less.

Fourth Preferred Embodiment

Figure 6:
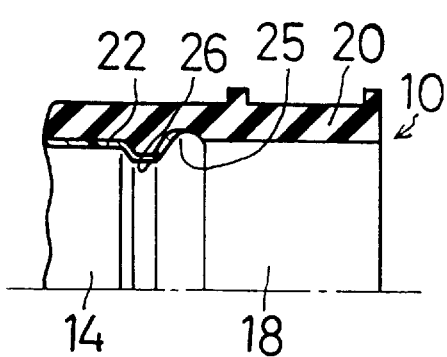
FIG. 6 is a main cross-sectional view of a multi-layered hose in the Fourth Preferred Embodiment.
Figure 7:
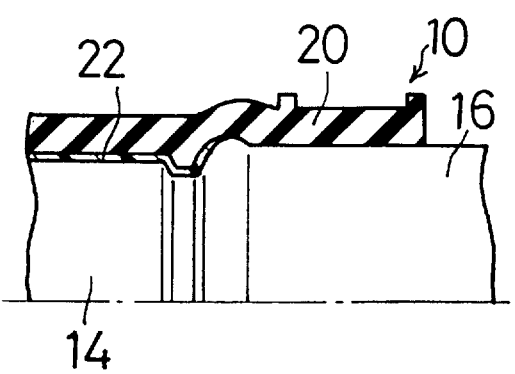
FIG. 7 is a main cross-sectional view for showing the condition that a nipple is inserted into the edge portion of the multi-layered hose in the Fourth Preferred Embodiment.

FIG. 6 shows a main cross-sectional area of a multi-layered hose 10 of the Fourth Preferred Embodiment. FIG. 7 shows a main cross-sectional area of the multi-layered hose 10 of the Fourth Preferred Embodiment when the nipple 16 is inserted into the edge portion of the multi-layered hose 10.

In the multi-layered hose 10, a ring-shaped projected portion 26 and the ring-shaped groove 25 are disposed at a boundary portion between the edge portion 18 and the main portion 14 of the rubber outer layer 20 from the main portion 14 toward the edge portion 18. As shown in FIG. 6, the projected portion 26 is trapezoid in cross-sectional view and it circulates the inner periphery surface. The edge of the resin inner layer 22 is disposed at the largest inner periphery diameter portion of the ring-shaped groove 25, and the edge surface of the inner layer 22 is contacted to the inner wall of the ring-shaped groove 25.

The multi-layered hose 10 of the Fourth Preferred Embodiment has the same functions and effects as those of the multi-layered hose 10 of the Second or Third Preferred Embodiment. The inner layer 22 is hardly come off from its edge surface. And, the edge of the inner layer 22 is not greatly enlarged by the tip portion of the nipple 16. Therefore, the extension of the inner layer 22 becomes less. Furthermore, the tip of the nipple 16 is contacted to and engaged with the side surface of the ring-shaped projected portion 26. As a result, the degree of the insertion of the nipple 16 is certainly known, and disadvantages due to an insufficient insertion of the nipple 16 can be prevented. Therefore, the multi-layered hose 10 is firmly engaged with the nipple 16. The top side of the multi-layered hose 10 is easily subjected by stress concentration when the nipple 16 is inserted into the multi-layered hose 10. Since the top side of the multi-layered hose 10 includes the projected portion 26, the multi-layered hose 10 is thick, thereby improving its wear resistance.

In the Fourth Preferred Embodiment, the projected portion 26 can be separated into two or three with the predetermined distance in the circumferential direction, or the projected portion 26 can be replaced by a multiple of projections which are arranged in the circumferential direction.

Fifth Preferred Embodiment

Figure 8:
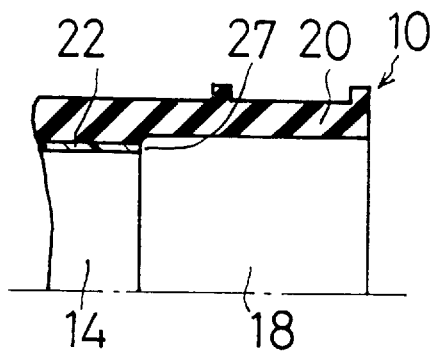
FIG. 8 shows a main cross-sectional view of a multi-layered hose in the Fifth Preferred Embodiment.
Figure 9:
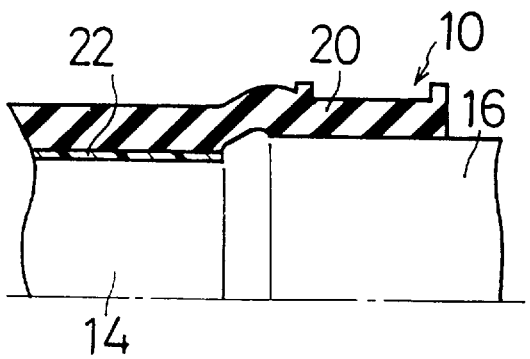
FIG. 9 is a main cross-sectional view for showing the condition that a nipple is inserted into the edge portion of the multi-layered hose in the Fifth Preferred Embodiment.

FIG. 8 shows a main cross-sectional area of a multi-layered hose 10 of the Fifth Preferred Embodiment. FIG. 9 shows a main cross-sectional area of the multi-layered hose 10 of the Fifth Preferred Embodiment when the nipple 16 is inserted into the edge portion of the multi-layered hose 10.

In the multi-layered hose 10, the inner diameter of the edge portion 18 is larger than that of the main portion 14. Namely, the thickness of the multi-layered hose 10 is thin at the edge portion, and a low stepping portion 27 is disposed between the main portion 14 and the edge portion 18. The inner layer 22 is formed only at the inner periphery surface of the main portion 14, and the edge surface of the inner layer 22 and the rubber outer layer 20 constitute the edge portion 18.

In the multi-layered hose 10, since the low stepping portion 27 is disposed between the main portion 14 and the edge portion 18, the tip of the nipple 16 is contacted to the edge surface of the stepping portion 27 when the nipple 16 is inserted into the edge portion 18. Therefore, the tip of the nipple 16 is also contacted to the edge surface of the inner layer 22 so that a fluid in the multi-layered hose 10 is not directly contacted to the rubber outer layer 20. In this embodiment, since the thickness of the edge portion is thinner than that of the main portion 14, the nipple 16 is easily detached.

The multi-layered hose 10 of the Fifth Preferred Embodiment is produced by the same method as that of the First Preferred Embodiment.

Sixth Preferred Embodiment

Figure 10:
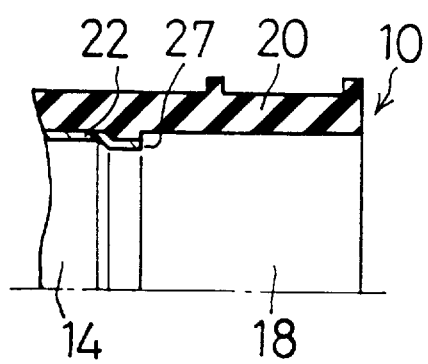
FIG. 10 is a main cross-sectional view of a multi-layered hose in the Sixth Preferred Embodiment.
Figure 11:
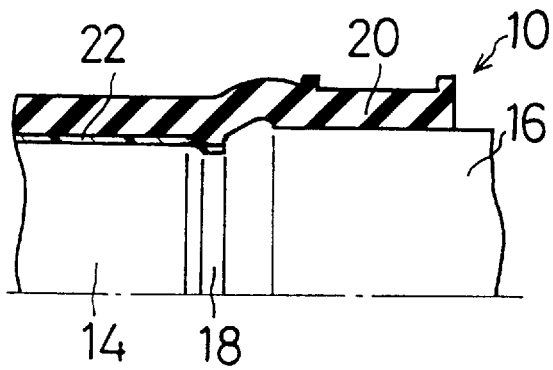
FIG. 11 is a main cross-sectional view for showing the condition that a nipple is inserted into the edge portion of the multi-layered hose in the Sixth Preferred Embodiment.

FIG. 10 shows a main cross-sectional area of a multi-layered hose 10 of the Sixth Preferred Embodiment. FIG. 11 shows a main cross-sectional area of the multi-layered hose 10 of the Sixth Preferred Embodiment when the nipple 16 is inserted into the edge portion of the multi-layered hose 10.

In the multi-layered hose 10, the low stepping portion 27 and a ring-shaped projected portion 28 are disposed at the inner periphery surface between the main portion 14 and the edge portion 18. The resin inner layer 22 is formed at the inner periphery surface of the main portion 14 including the projected portion 28. The rubber outer layer 20 has the same thickness at both the main portion 14 and the edge portion 18 except at the projected portion 28.

The multi-layered hose 10 of the Sixth Preferred Embodiment has the same functions and effects as those of the multi-layered hose 10 of the Fifth Preferred Embodiment. Furthermore, the above multi-layered hose 10 has the projected portion 28 so that the multi-layered hose 10 is firmly engaged with the nipple 16 as shown in the Fourth Preferred Embodiment. Therefore, the multi-layered hose 10 shows excellent wear resistance.

Seventh Preferred Embodiment

Figure 12:
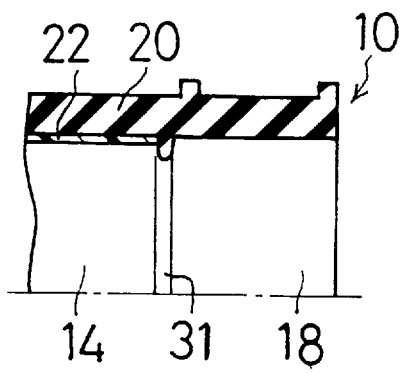
FIG. 12 is a main cross-sectional view of a multi-layered hose in the Seventh Preferred Embodiment.
Figure 13:
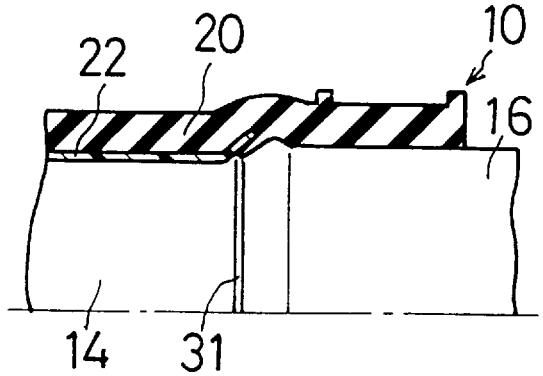
FIG. 13 is a main cross-sectional view for showing the condition that a nipple is inserted into the edge portion of the multi-layered hose in the Seventh Preferred Embodiment.

FIG. 12 shows a main cross-sectional area of a multi-layered hose 10 of the Seventh Preferred Embodiment. FIG. 13 shows a main cross-sectional area of the multi-layered hose 10 of the Seventh Preferred Embodiment when the nipple 16 is inserted into the edge portion of the multi-layered hose 10.

In the multi-layered hose 10, a ring-shaped projected piece 31 in which the thickness in the axial direction is thin is disposed at a boundary portion between the edge portion 18 and the main portion 14. The resin inner layer 22 is contacted to the side surface of the projected piece 31.

As shown in FIG. 13, the projected piece 31 is pushed by the tip of the nipple 16 to cover the edge portion of the inner layer 22. Namely, the projected piece 31 exists between the tip portion of the nipple 16 and the edge portion of the inner layer 22 to seal a clearance between them. Therefore, a fluid leaked along the surface of the nipple 16 is certainly prevented.

The multi-layered hose 10 of the Seventh Preferred Embodiment is produced by the same method as that of the First Preferred Embodiment.

Eighth Preferred Embodiment

Figure 14:
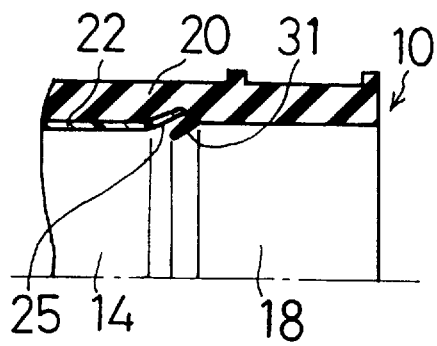
FIG. 14 shows a main cross-sectional view of a multi-layered hose in the Eighth Preferred Embodiment.
Figure 15:
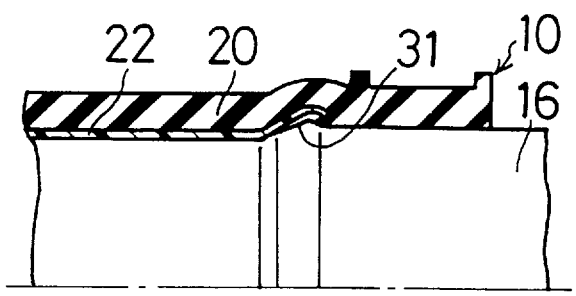
FIG. 15 is a main cross-sectional view for showing the condition that a nipple is inserted into the edge portion of the multi-layered hose in the Eighth Preferred Embodiment.

FIG. 14 shows a main cross-sectional area of a multi-layered hose 10 of the Eighth Preferred Embodiment. FIG. 15 shows a main cross-sectional area of the multi-layered hose 10 of the Eighth Preferred Embodiment when the nipple 16 is inserted into the edge portion of the multi-layered hose 10.

In the multi-layered hose 10, the ring-shaped groove 25 as shown in FIG. 4 and a ring-shaped projected piece 31 which circulate the inner periphery surface are disposed at a boundary portion between the edge portion 18 and the main portion 14 from the main portion 14 toward the edge portion 18. The edge of the resin inner layer 22 is disposed at the bottom of the ring-shaped groove 25. The ring-shaped groove 25 and the ring-shaped projected piece 31 are projected or recessed toward the inclining direction against the axis of the multi-layered hose 10.

The above projected piece 31 has the same sealing function as that of the projected piece 31 of the Seventh Preferred Embodiment. The edge of the inner layer 22 is extended to the bottom of the ring-shaped groove 25. Since the diameter of the ring-shaped groove 25 increases toward the edge portion, the ring-shaped groove 25 is not deformed by the tip of the nipple 16 when the nipple 16 is inserted, thereby improving wear resistance. The projected piece 31 can seal in wide ranges, and sealing capacity is improved.

Ninth Preferred Embodiment

Figure 16:
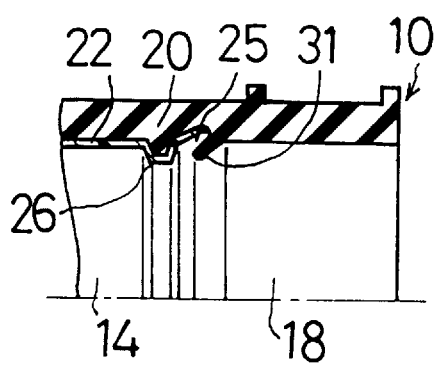
FIG. 16 is a main cross-sectional view of a multi-layered hose in the Ninth Preferred Embodiment.
Figure 17:
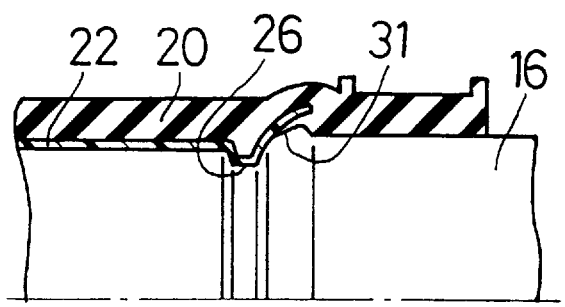
FIG. 17 is a main cross-sectional view for showing the condition that a nipple is inserted into the edge portion of the multi-layered hose in the Ninth Preferred Embodiment.

FIG. 16 shows a main cross-sectional area of a multi-layered hose 10 of the Ninth Preferred Embodiment. FIG. 17 shows a main cross-sectional area of the multi-layered hose 10 of the Ninth Preferred Embodiment when the nipple 16 is inserted into the edge portion of the multi-layered hose 10.

In the multi-layered hose 10, the ring-shaped projected portion 26 and the ring-shaped projection groove 25 as shown in FIG. 6 and the ring-shaped projected piece 31 as shown in FIG. 14 are disposed at a boundary portion between the edge portion 18 and the main portion 14. The resin inner layer 22 covers the surface of the projected-line 26, and the edge of the inner layer 22 is disposed at the bottom of the ring-shaped groove 25.

The above projected piece 31 has the same sealing function as that of the projected piece 31 of the Seventh Preferred Embodiment. The edge of the inner layer 22 is extended to the bottom of the ring-shaped groove 25. Since the diameter of the ring-shaped groove 25 increases toward the edge portion, the ring-shaped groove 25 is not deformed by the tip of the nipple 16 when the nipple 16 is inserted, thereby improving wear resistance. The projected piece 31 can seal in wide ranges, and sealing capacity is improved. Furthermore, the projected portion 26 is disposed at the tip of the nipple 16 when the nipple 16 is inserted so that the multi-layered hose 10 is firmly engaged with the nipple 16 as shown in the Fourth Preferred Embodiment. Therefore, the multi-layered hose 10 shows excellent wear resistance.

Tenth Preferred Embodiment

Figure 18:
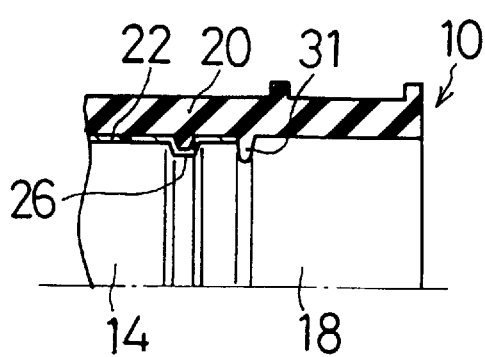
FIG. 18 is a main cross-sectional view of a multi-layered hose in the Tenth Preferred Embodiment.
Figure 19:
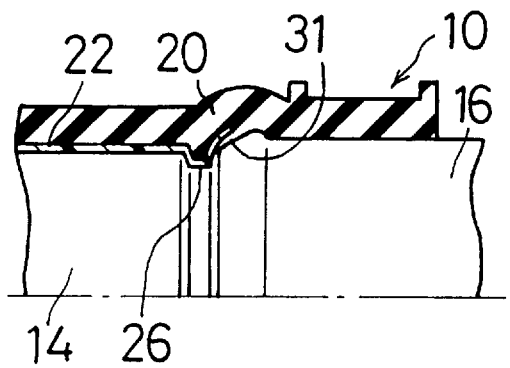
FIG. 19 is a main cross-sectional view for showing the condition that a nipple is inserted into the edge portion of the multi-layered hose in the Tenth Preferred Embodiment.

FIG. 18 shows a main cross-sectional area of a multi-layered hose 10 of the Tenth Preferred Embodiment. FIG. 19 shows a main cross-sectional area of the multi-layered hose 10 of the Tenth Preferred Embodiment when the nipple 16 is inserted into the edge portion of the multi-layered hose 10.

In the multi-layered hose 10, the ring-shaped projected portion 26 as shown in FIG. 6 and the projected piece 31 as shown in FIG. 12 are disposed at a boundary between the edge portion 18 and the main portion 14 with a certain distance from each other in the axial direction. And, the edge surface of the inner layer 22 is contacted to the side surface of the projected piece 31.

The above projected piece 31 has the same sealing function as that of the projected piece 31 of the Seventh Preferred Embodiment. The projected portion 26 is disposed at the tip of the nipple 16 when the nipple is inserted, thereby improving wear resistance of the multi-layered hose 10.

Eleventh Preferred Embodiment

Figure 20:
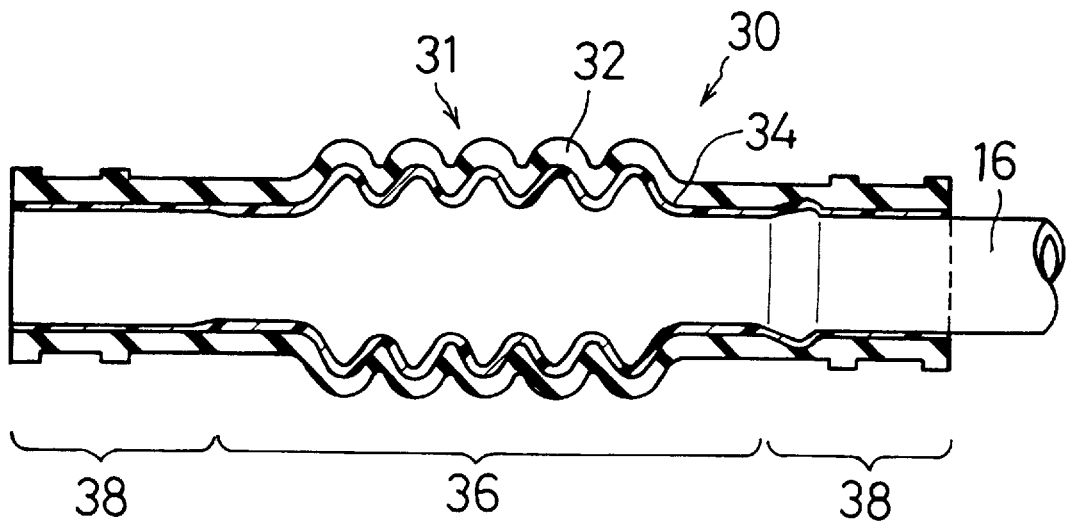
FIG. 20 is a general cross-sectional view for showing the condition that a nipple is inserted into the edge portion of a multi-layered hose in the Eleventh Preferred Embodiment.

FIG. 20 is a cross-sectional view of a multi-layered hose 30 of the Eleventh Preferred Embodiment. The nipple 16 is inserted into a right edge portion 38 of the multi-layered hose 30. The multi-layered hose 30 comprises a hose main portion 36 having a bellows portion 31 and both edge portions 38 and 38 into which the mating metal pipe 16 is inserted. The main portion 36 and the edge portion 38 have a laminated structure comprising a rubber outer layer 32 and a resin inner layer 34.

Figure 21:
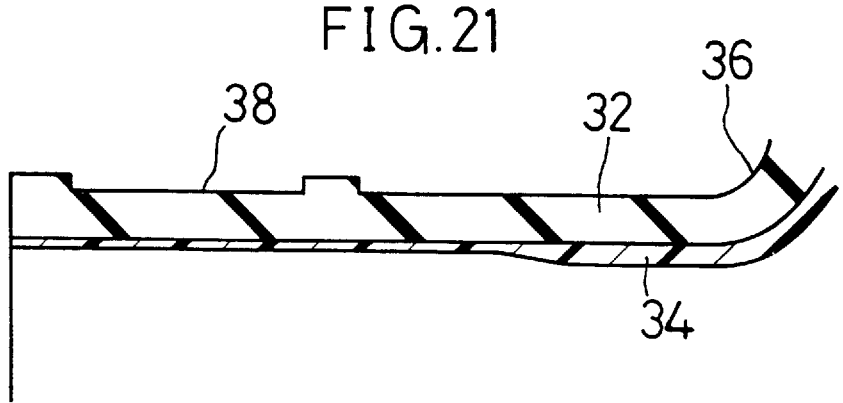
FIG. 21 is an enlarged cross-sectional view for showing the edge portion of the multi-layered hose in the Eleventh Preferred Embodiment.

The inner layer 34 is formed at the whole inner surface of the main portion 36 and the edge portion 38. As shown in FIG. 21, the thickness of the resin inner layer 34 at the hose edge portion 38 (for example, 0.05 mm) is thinner than that of the resin inner layer 34 at the hose main portion 36 (for example, 0.15 mm).

As above-described, the resin inner layer 34 is also formed at the hose edge portion 38, and the thickness of the resin inner layer 34 at the hose edge portion 38 is thinner than that of the resin inner layer 34 at the hose main portion 36. Therefore, stress concentration acted by the nipple 16 and peeling of the resin inner layer 34 caused by an inner fluid can be effectively prevented.

The thickness of the resin inner layer 34 at the hose edge portion 38 is thin so that it shows excellent flexibility. Therefore, the resin inner layer 34 is easily deformed in accordance with the rubber outer layer 32. Furthermore, excellent sealing can be obtained when the nipple 16 is inserted into the edge portion 38.

Figure 22:
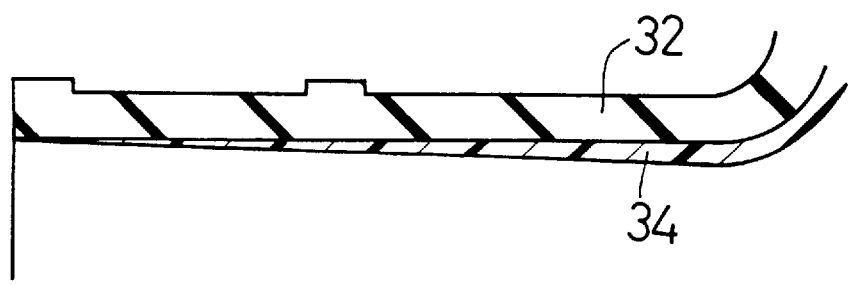
FIG. 22 is an enlarged cross-sectional view for showing the edge portion of a modified example of the multi-layered hose in the Eleventh Preferred Embodiment.
Figure 25:
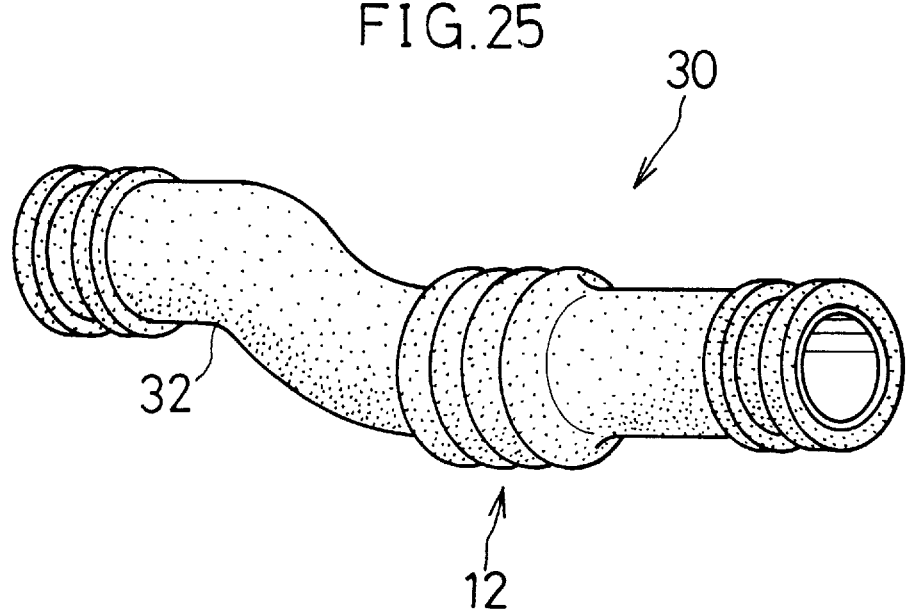
FIG. 25 is a perspective view for showing an example of an outer appearance of the multi-layered hose of the present invention.
Figure 26:
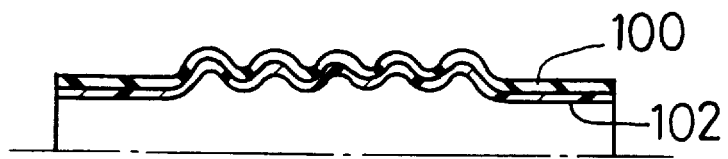
FIG. 26 is a partial cross-sectional view of a conventional multi-layered hose.
Figure 27:
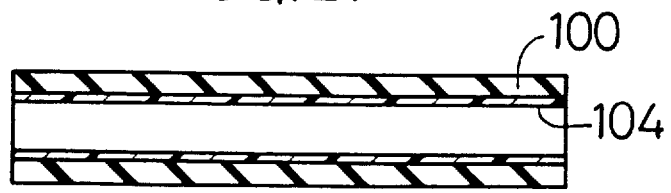
FIG. 27 is a general cross-sectional view of another conventional multi-layered hose.
Figure 28:
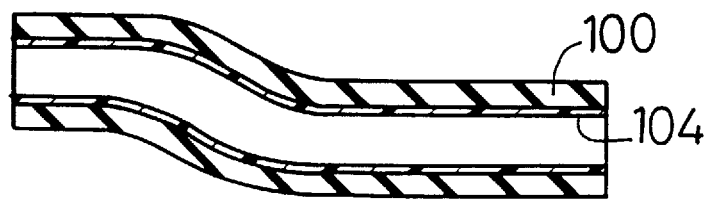
FIG. 28 is a general cross-sectional view of the other conventional multi-layered hose.
Figure 29:
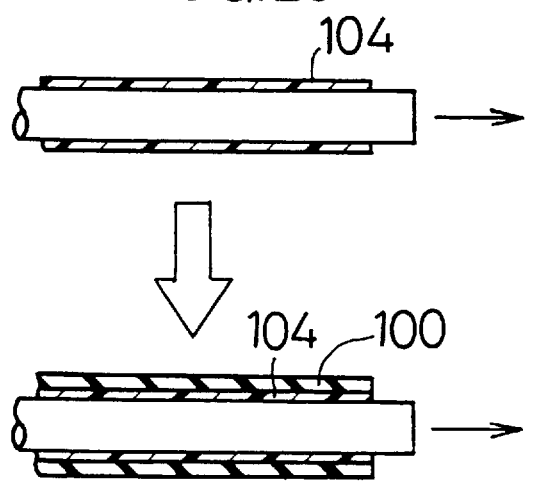
FIG. 29 is a cross-sectional view for showing a process of producing the conventional multi-layered hose.

As shown in FIG. 22, it is possible that the thickness of the resin inner layer 34 at the hose edge portion 38 is decreased as the resin inner layer is far from the hose main portion 36. As a result, the resin inner layer 34 is satisfactorily prevented from being come off.

Twelfth Preferred Embodiment

FIG. 23 is a partial cross-sectional view of a multi-layered hose 40 of the Twelfth Preferred Embodiment. The nipple 16 is inserted into a left edge portion 48 of the multi-layered hose 40. The multi-layered hose 40 comprises a hose main portion 46 having a bellows portion 41 and both edge portions 48 and 48 into which the mating metal pipe 16 is inserted. The main portion 46 and the edge portion 48 have a laminated structure comprising a rubber outer layer 42 and a metal inner layer 44.

A thin stainless-steel pipe is plastic-molded to form the inner layer 44. The main portion of the inner layer 44 is a bellows portion, and the edge portion of the inner layer 44 is a ring-shaped projected portion 45 which projects toward the inner periphery side. Furthermore, the inner layer 44 includes a loto-shaped opening edge 47 whose inner periphery diameter increases toward an opening side in the axial direction.

A reinforced cloth 43 which is formed by compiling reinforced threads is disposed in the center portion of the outer layer 42. A ring-shaped projected piece 49 which projects toward the edge surface side of the opening edge 47 in the axial core direction and which encircles the inner periphery surface inclined in the direction of the main portion 46 is formed between the edge portion 48 and the main portion 46.

The ring-shaped projected portion 45 is used as a stopper for the nipple 16 which is inserted. The opening edge 47 is engaged with a ring-shaped projected portion of the nipple 16 which is positioned at the tip side and projects in the outer periphery direction. The ring-shaped projected piece 49 is pushed by the tip portion of the nipple 16 and it is supported between the tip portion of the nipple 16 and the opening edge 47 to show excellent sealing.

In the multi-layered hose 40, the inner layer 44 is made of metal so that no oil penetration occurs. Since the reinforced cloth 43 is disposed in the outer layer 42, strength is improved. Due to the ring-shaped projected portion 45, the opening edge 47 and the ring-shaped projected piece 49, the nipple 16 is firmly engaged and fixed at the predetermined position, and the inner layer 44 and the nipple 16 are sealed.

Thirteenth Preferred Embodiment

FIG. 24 is a partial cross-sectional view of a multi-layered hose 50 of the Thirteenth Preferred Embodiment. The nipple 16 is inserted into a left edge portion 58 of the multi-layered hose 50. The multi-layered hose 50 comprises a hose main portion 56 having a bellows portion 51 and both edge portions 58 and 58 into which the mating metal pipe 16 is inserted. The main portion 56 has a laminated structure comprising a rubber outer layer 52 and a metal inner layer 54. The edge portion 58 mainly comprises the rubber outer layer 52 and the metal inner layer 54 is partly disposed at the inner periphery surface of the edge portion 58.

A thin stainless-steel pipe is plastic-molded to form the inner layer 54. The main portion of the inner layer 54 is a bellows portion, and the edge portion of the inner layer 54 is a straight tube 57 whose inner periphery diameter is fixed. The inner periphery diameter of the straight tube 57 is slightly larger than the outer periphery diameter of the tip portion of the nipple 16 in order to be engaged with the nipple 16.

The outer layer 52 is made of a laminated rubber comprising two kinds of rubber. The outer layer 52 is integrally valcanized and connected to the outer periphery surface of the inner layer 54. A ring-shaped projected portion 53 which encircles the outer periphery of the outer layer 52 is disposed between the main portion 56 and the edge portion 58. The ring-shaped projected portion 53 is a mark to show the position for fastening a fixed band 161.

In the multi-layered hose 50, the inner layer 54 is made of metal so that no oil penetration occurs. Since the outer layer 52 is made of the laminated rubber, it is easy to obtain wear resistance which is required for the multi-layered hose 50. The inner layer 54 extends to the middle portion of the edge portion 58 in the axial direction so that the inner layer 54 is directly engaged with the nipple 16. As a result, the part of the multi-layered hose 50 to which the tip portion of the nipple 16 is contacted has high strength, and it is suitable for practical use. Since the outer layer 52 is exposed at the half side of the edge portion 58, the outer layer 52 and the nipple 16 are firmly sealed.

Having now fully described the invention, it will be apparent to one of ordinary skill in the art that many changes and modifications can be made thereto without departing from the spirit or scope of the invention as set forth herein.

What is claimed is:

1. A multi-layered hose comprising
   a flexible rubber outer layer and a resin or metal inner layer integrally formed at an inner periphery surface of said outer layer,
   an edge portion for receiving a mating member, said inner layer being located at said inner periphery surface of a main portion of said flexible rubber outer layer and at said inner periphery surface of said edge portion of said outer layers,
   at least a part of said inner layer at said inner periphery surface of said edge portion of said outer layer tapering gradually from a thickness at said main portion until reaching a lesser thickness for progressively increasing sealing engagement with a leading edge of the mating member as the mating member is inserted into said edge portion.

2. A multi-layered hose according to claim 1, wherein said inner layer formed at said inner periphery surface of said edge portion of said outer layer tapers gradually from said thickness at said main portion until reaching said lesser thickness at a terminal edge of said edge portion.

3. A multi-layered hose according to claim 1, wherein said inner layer has a thickness less than 0.1 mm at said edge portion.

4. A multi-layered hose according to claim 3, wherein said inner layer has a thickness of 0.05 mm at said edge portion.

5. A multi-layered hose according to claim 3, wherein said inner layer is resin.

6. A multi-layered hose according to claim 1, wherein said inner layer has a thickness less than 0.2 mm at said edge portion.

7. A multi-layered hose according to claim 1, wherein said inner layer has a thickness of 0.15 mm at said edge portion.

8. A multi-layered hose according to claim 1, wherein said inner layer is metal.

9. A multi-layered hose according to claim 1, wherein said inner layer has a thickness of 0.05 mm at said edge portion and a thickness of 0.15 mm at said main portion.

10. A multi-layered hose comprising:

a flexible rubber outer layer and an inner layer integrally formed at an inner periphery surface of said outer layer to form a main portion and at least one edge portion located at at least one end of said main portion, said at least one edge portion being configured for receiving a mating member in abutting relationship with said inner layer, said inner layer being located at said inner periphery of said main portion and said at least one edge portion so that when the mating members are inserted into said at least one edge portion, said at least one edge portion closely engages and seals with an outer periphery of the mating members to allow fluid passing through the mating members to pass directly to said inner layer while avoiding contact with said outer layer, at least a part of said inner layer at said at least one edge portion tapering gradually from a thickness at said main portion until reaching a lesser thickness for progressively increasing sealing engagement with a leading edge of the mating member as the mating member is inserted into said edge portion.

11. A multi-layered hose according to claim 10, wherein said inner layer at said at least one edge portion tapers gradually from a thickness at said main portion until reaching said lesser thickness at said terminal edge of said at least one edge portion.

12. A multi-layered hose according to claim 10, wherein said inner layer has a thickness less than 0.1 mm at said at least one edge portion.

13. A multi-layered hose according to claim 12, wherein said inner layer has a thickness of 0.05 mm at said at least one edge portion.

14. A multi-layered hose according to claim 12, wherein said inner layer is resin.

15. A multi-layered hose according to claim 10, wherein said inner layer has a thickness less than 0.2 mm at said at least one edge portion.

16. A multi-layered hose according to claim 10, wherein said inner layer has a thickness of 0.15 mm.

17. A multi-layered hose according to claim 10, wherein said inner layer is metal.

18. A multi-layered hose according to claim 10, wherein said inner layer has a thickness of 0.05 mm at said at least one edge portion and a thickness of 0.15 mm at said main portion.

* * * * *